(12) United States Patent
Suzuki et al.

(10) Patent No.: US 8,273,498 B2
(45) Date of Patent: Sep. 25, 2012

(54) SOLID POLYMER FUEL CELL-PURPOSE ELECTROLYTE MEMBRANE, PRODUCTION METHOD THEREFOR, AND MEMBRANE-ELECTRODE ASSEMBLY

(75) Inventors: Hiroshi Suzuki, Aichi-ken (JP); Yoshitaka Kino, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 669 days.

(21) Appl. No.: 12/438,012

(22) PCT Filed: Aug. 29, 2007

(86) PCT No.: PCT/IB2007/002482
§ 371 (c)(1),
(2), (4) Date: Feb. 19, 2009

(87) PCT Pub. No.: WO2008/029243
PCT Pub. Date: Mar. 13, 2008

(65) Prior Publication Data
US 2010/0173222 A1    Jul. 8, 2010

(30) Foreign Application Priority Data

Aug. 31, 2006    (JP) .................................. 2006-236160

(51) Int. Cl.
*H01M 8/10* (2006.01)

(52) U.S. Cl. ........ 429/483; 429/535; 429/479; 429/508; 429/509; 264/148; 264/171.13; 264/176.1; 264/177.1

(58) Field of Classification Search .................. 429/535, 429/479, 483, 508, 509; 264/241, 510, 148, 264/176.1, 165, 171.1, 173.16
See application file for complete search history.

(56) References Cited

U.S. PATENT DOCUMENTS

2002/0034670 A1    3/2002   Suenaga et al.

FOREIGN PATENT DOCUMENTS

| EP | 1 156 546 A1 | 11/2001 |
| EP | 1 255 315 A1 | 6/2002 |
| EP | 1 302 996 A2 | 4/2003 |
| EP | 1 608 033 A2 | 12/2005 |
| JP | 6-29032 | 2/1994 |

(Continued)

OTHER PUBLICATIONS

"Notification of Reasons for Refusal" in Japanese Patent Application No. 2006-236160, filed Aug. 31, 2006 (Drafting date: Dec. 25, 2008).

*Primary Examiner* — Jennifer Michener
*Assistant Examiner* — Heng Chan
(74) *Attorney, Agent, or Firm* — Finnegan, Henderson, Farabow, Garrett & Dunner, LLP

(57) ABSTRACT

In an electrolyte membrane (10) for a solid polymer fuel cell, sealing ribs (12) of a predetermined height made of an electrolyte resin is formed integrally with the electrolyte membrane (10). Using the electrolyte membrane, a membrane-electrode assembly (20) is formed, which is further processed into a fuel cell (30). Thus, an electrolyte membrane and a membrane-electrode assembly which are capable of improving the sealing characteristic when incorporated into a fuel cell are obtained. Besides, a fuel cell improved in the sealing characteristic is obtained.

5 Claims, 10 Drawing Sheets

FOREIGN PATENT DOCUMENTS

| | | |
|---|---|---|
| JP | 9-194609 | 7/1997 |
| JP | 9-283163 | 10/1997 |
| JP | 2000-243413 | 9/2000 |
| JP | 2000243413 A * | 9/2000 |
| JP | 2002-231269 | 8/2002 |
| JP | 2003-68319 | 3/2003 |
| JP | 2004-119269 | 4/2004 |
| JP | 2005-85594 | 3/2005 |
| JP | 2005-162784 | 6/2005 |
| JP | 2005-243293 | 9/2005 |
| JP | 2006-4677 | 1/2006 |
| JP | 2007-172929 | 7/2007 |

* cited by examiner

PRIOR ART

SOLID POLYMER FUEL CELL-PURPOSE ELECTROLYTE MEMBRANE, PRODUCTION METHOD THEREFOR, AND MEMBRANE-ELECTRODE ASSEMBLY

CROSS-REFERENCE TO RELATED APPLICATIONS

This application is a national phase application of International Application No. PCT/IB2007/002482, filed Aug. 29, 2007, and claims the priority of Japanese Application No. 2006-236160, filed Aug. 31, 2006, the contents of both of which are incorporated herein by reference.

BACKGROUND OF THE INVENTION

1. Field of the Invention

The invention relates to an electrolyte membrane for a solid polymer fuel cell, and a production method for the electrolyte membrane, and also relates to a membrane-electrode assembly and a fuel cell that include the electrolyte membrane.

2. Description of the Related Art

Solid polymer type fuel cell batteries are known as a form of fuel cell batteries. The solid polymer type fuel cell battery, as compared with other forms of fuel cell batteries, is low in operation temperature (about 80° C. to 100° C.), and allows cost reduction and compact design, and is therefore regarded as a promising motive power source of a motor vehicle or the like.

In a solid polymer type fuel cell battery, as shown in FIG. 8, a membrane-electrode assembly (MEA) 50, a main component element, is sandwiched by separators 51, 51 that have a fuel (hydrogen) gas channel and an air gas channel, thus forming one fuel cell 52 that is called unit cell. The membrane-electrode assembly 50 has a structure in which an anode-side gas diffusion electrode 58a made up of a catalyst layer 56a and a gas diffusion layer 57a on the anode side is stacked on one side of a solid polymer electrolyte membrane 55 that is an ion exchange membrane, and a cathode-side gas diffusion electrode 58b made up of a catalyst layer 56b and a gas diffusion layer 57b on the cathode side is stacked on the other side of the solid polymer electrolyte membrane 55.

In the unit cell 52, it is necessary to secure a gas channel between the gas diffusion electrodes 58a, 58b and the separators 51 and prevent the leakage of gas to the outside of the cell and the mixture of the fuel gas and the oxidant gas. The stacking of the gas diffusion electrodes 58a, 58b on the surfaces of the electrolyte membrane 55 forms a stepped surface in the membrane-electrode assembly 50. Therefore, when the membrane-electrode assembly 50 is sandwiched by separators 51 to form a fuel cell 52, a gap that is formed due to the step needs to be sealed. In ordinary cases, therefore, a sealing-purpose resin material 59 is applied onto the surfaces of the electrolyte membrane 55 extending out from an end side of the gas diffusion electrodes 58a, 58b, to such a height that the rein material 59 reaches the separators 51. Then, the resin material 59 is hardened by heating to form a seal portion, thereby securing a sealing characteristic.

Another technology of sealing the gap caused by the aforementioned step in the fuel cell 52 is disclosed in the Japanese Patent Application Publication No. JP-A-2006-4677. That is, as shown in FIG. 9, a seal member 59a made of a rubber-like elastomer or the like which has a protrusion 59b is provided so as to cover a portion 55a of the electrolyte membrane 55 which extends sideway from the end portions of the gas diffusion electrodes 58a, 58b of the electrolyte membrane 55. When the membrane-electrode assembly 50 is sandwiched by separators 51 to form a fuel cell 52, the protrusion 59b enters, in a pressed contact fashion, a recess portion 51a formed in a separator 51.

Incidentally, the electrolyte membrane used in the solid polymer fuel cell is mainly a thin film of perfluorosulfonic acid polymer (Nafion, by DuPont, USA), that is, an electrolyte resin (ion exchange resin). Besides, a thin film made of an electrolyte resin alone does not achieve sufficient strength. Therefore, a technology described in Japanese Patent Application Publication No. JP-A-9-194609 uses a reinforced type electrolyte membrane formed by impregnating a porous reinforcement film (e.g., a thin film formed by stretching PTFE, a polyolefin resin, etc.) with a solvent-dissolved polymer (electrolyte resin), and then introducing ion exchange groups in the electrolyte polymer after it is dried.

As described above, in order to seal the gaps between the electrolyte membranes and the separators which are formed as a result of the steps formed on membrane-electrode assemblies, the fuel cells of the related-art technology adopt either the application of a seal material or member, that is, a separate material, onto the edge portion of the electrolyte membrane, or the covering of the edge portion of the electrolyte membrane with a seal member that is made of a separate material. In the method in which a seal material is applied and is hardened by heating, non-uniform application of the seal material is likely to allow leakage, or the requirement of long-time heating or hardening by heating results in damages to the membrane-electrode assembly. Furthermore, non-uniform heat-hardening of the seal material also leads to leakage.

In the case of seal means in which a seal member made of a rubber-like elastomer or the like is provided to cover the edge portion of the electrolyte membrane, the production thereof is not easy, although high sealing effect can be expected due to the pressed contact of the seal member to the separator side. Furthermore, there is an inconvenience of the seal member being liable to positional deviation.

Furthermore, in either one of the related-art sealing technology in the fuel cells, a material different from the electrolyte membrane is interposed between the electrolyte membrane and the separators, and therefore a boundary surface is inevitably formed between the electrolyte membrane and the seal member, and there is a risk of the boundary surface causing breakage of seal.

SUMMARY OF THE INVENTION

It is an object of the invention to provide an electrolyte membrane in a fuel cell in which a gap formed between a separator and the electrolyte membrane that form a membrane-electrode assembly can be more completely sealed, and a production method for the electrolyte membrane. It is another object of the invention to provide a membrane-electrode assembly and a fuel cell that incorporate the electrolyte membrane.

An electrolyte membrane in accordance with a first aspect of the invention is an electrolyte membrane for a solid polymer fuel cell, and basically characterized in that a sealing rib of a predetermined height made of an electrolyte resin or a resin integratable with the electrolyte membrane is formed integrally with the electrolyte membrane. The electrolyte membrane may be a reinforced type electrolyte membrane that includes a porous reinforcement film. The height of the sealing ribs is set in accordance with the thickness of the gas diffusion electrodes that are to be combined with the electrolyte membrane to form a membrane-electrode assembly. The height is within the range of 10 μm to 500 μm in the case of a membrane-electrode assembly for use in an ordinary solid polymer type fuel cell.

The electrolyte resin that forms the electrolyte membrane may be an electrolyte resin that is used in the related art. In the case where a production method described later is adopted, the electrolyte resin may be a fluorine type electrolyte resin that does not thermally degrade. In that case, the produced electrolyte membrane is subjected to a process of giving ion exchange characteristic to an electrolyte polymer by a hydrolysis process or the like, thus obtaining an electrolyte membrane.

In the electrolyte membrane according to the first aspect of the invention, the sealing ribs are formed integrally with the electrolyte membrane main body without a boundary surface, and therefore a stable sealing characteristic therebetween can be secured.

A second aspect of the invention relates to a membrane-electrode assembly that includes an electrolyte membrane according to the first aspect, and gas diffusion electrodes stacked on two surfaces of the electrolyte membrane. The electrolyte membrane is formed so as to be larger than the gas diffusion electrodes, and has an extension portion that extends sideway from end portions of the gas diffusion electrodes. The sealing ribs of the predetermined height are formed integrally with the extension portion of the electrolyte membrane so that the predetermined height is greater than a thickness of the gas diffusion electrodes.

A third aspect of the invention relates to a fuel cell including the membrane-electrode assembly according to the second aspect, and separators sandwiching the membrane-electrode assembly, the fuel cell being characterized in that top portions of the sealing ribs formed integrally with the electrolyte membrane contact the separators.

In the membrane-electrode assembly and the fuel cell described above, high sealing characteristic can be secured, and therefore the leakage of gas to the outside of the fuel cell and the mixture of the fuel gas and the oxidant gas (gas cross) can be reliably restrained.

A fourth aspect of the invention relates to a first method of producing an electrolyte membrane according to the first aspect. The production method for the electrolyte membrane includes at least the steps of forming the sealing ribs of the predetermined height made of an electrolyte resin integrally with the elongated-shape electrolyte membrane near two side edges of the elongated-shape electrolyte membrane by using a die having, near two side edges of a resin ejection opening, recessed grooves whose depth corresponds to the height of the sealing ribs, and extruding the thermally molten electrolyte resin from the resin ejection opening of the die.

In the first production method according to the fourth aspect, a conventionally known kneading extruder device feeds the thermally molten electrolyte resin to the die, and continuously extrudes the thermally molten electrolyte resin in an elongated thin-film shape from the resin ejection opening of the die. The resin ejection opening of the die has, near its two side edges, recessed grooves whose depth corresponds to the height of the sealing ribs that are formed on the electrolyte membrane to be produced. Therefore, near the two side edges of the molten electrolyte resin extruded, protruded sealing ribs are formed integrally with the electrolyte membrane main body. As descried above, in this production method, the electrolyte resin to be used may be fluorine type electrolyte resin that does not thermally degrade. In that case, after the extrusion, the membrane is subjected to a process of giving ion exchange characteristic to an electrolyte polymer by cooling and a hydrolysis process or the like, thus obtaining an electrolyte membrane.

A fifth aspect of the invention relates to a second production method for an electrolyte membrane. The method includes at least the step where a die having a membrane passing path through which the porous reinforcement film passes, recessed grooves which are formed near two side edges of an outlet portion of the membrane passing path and whose depth corresponds to the height of the sealing ribs, and resin ejection openings that are positioned at two surfaces of the porous reinforcement film that passes through the membrane passing path, the step where while the porous reinforcement film is being passed through the membrane passing path, thermally molten electrolyte resin is extruded from the resin ejection opening of the die so that the porous reinforcement film is impregnated with the molten electrolyte resin, and the step where when the porous reinforcement film impregnated with the resin passes through the outlet portion of the membrane passing path, the sealing ribs of the predetermined height made of the electrolyte resin are formed integrally with the resin-impregnated porous reinforcement film, near two side edges of the porous reinforcement film, so that the porous reinforcement film is extruded from the die as an elongated-shape reinforced type electrolyte membrane.

The second production method according to the fifth aspect is a method for producing a so-called reinforced type electrolyte membrane. The electrolyte resin to be used and the method of supplying the thermally molten electrolyte resin to the die may be the same as in the first production method according to the fourth aspect of the invention. Examples of the porous reinforcement film to be used include porous reinforcement films created by stretching a PTFE (polytetrafluoroethylene), a polyolefin resin, etc., in the monoaxial direction or the biaxial directions. The thickness thereof may be about 5 μm to about 50 μm.

In the second production method according to the fifth aspect, too, the electrolyte membrane including the porous reinforcement film which is extruded from the die has, near its two side edges, protruded sealing ribs that are formed integrally with the electrolyte membrane main body. As described above, in this production method, too, the electrolyte resin to be used may be a fluorine type electrolyte resin that does not thermally degrade. In that case, after the extrusion, the membrane is subjected to a process of giving ion exchange characteristic to an electrolyte polymer by cooling and a hydrolysis process or the like, thus obtaining a reinforced type electrolyte membrane.

In any of the foregoing production methods, an elongated-shape electrolyte membrane in which sealing ribs are formed integrally with the electrolyte membrane near the two side edges thereof is obtained.

If the electrolyte membrane is actually used as electrolyte membranes for fuel cells, the elongated-shape electrolyte membrane is cut to a predetermined width to provide rectangular electrolyte membranes. In that case, the two cut-side edge portions do not have sealing ribs. With respect to these two side edges, a sealing technology described in Japanese Patent Application Publication No. JP-A-2006-4677 or Japanese Patent Application Publication No. JP-A-9-194609 or the like may be employed to form fuel cells. In that case, however, it becomes difficult to secure uniform sealing characteristic in the entire edges.

In order to solve this, the production method for the electrolyte membrane may further include the step of cutting the produced elongated-shape electrolyte membrane provided with the sealing ribs of the predetermined height made of the electrolyte resin which are formed integrally with the electrolyte membrane near the two side edges of the electrolyte membrane, into a rectangular electrolyte membrane with a predetermined width, the step of forming superimposed portions along two side edges of the rectangular electrolyte membrane along which a sealing rib is not formed integrally with the electrolyte membrane, and the step of forming the electrolyte resin-made sealing ribs of the predetermined height integrally with the electrolyte membrane by melting at least the superimposed portions by, for example, sandwiching it between heating dies.

Therefore, the step of forming the superimposed portions can be performed by a technique of, for example, bending or rolling back the side edge portions that do not have a sealing rib. The electrolyte resin of the portions having an increased thickness due to the superimposition is melted by, for example, sandwiching the portions between heating dies. As a result, sealing ribs corresponding in shape to the recessed grooves formed on the heating dies are formed integrally with the electrolyte membrane main body. After that, by performing a hydrolysis process of the like, if needed, an electrolyte membrane whose four side edges are provided with electrolyte resin-made sealing ribs that are formed integrally with the electrolyte membrane main body is obtained. The shape of the recessed grooves formed on the heating dies is set as appropriate, in accordance with the shape of the sealing, ribs required for the side edges.

A sixth aspect of the invention relates to still another production method for an electrolyte membrane. The production method includes at least the step where an electrolyte membrane that does not have a sealing rib is created, the step where a resin particle integratable with the electrolyte membrane when melted or an electrolyte resin particle is sprayed to sites on the created electrolyte membrane where the sealing ribs are to be formed, and the step in which the sealing ribs of the predetermined height made of the resin particle or electrolyte resin is formed integrally with the electrolyte membrane by thermally melting the resin particle or the electrolyte resin particle sprayed to the electrolyte membrane.

In the production method according to the sixth aspect, the starting material is a conventionally used electrolyte membrane that does not have a sealing rib. This production method for the electrolyte membrane is arbitrary, and is free of restriction. For example, the electrolyte membrane may be a flat electrolyte membrane obtained by extruding a molten electrolyte resin from a die. Furthermore, the electrolyte membrane may also be a reinforced type electrolyte membrane that includes a porous reinforcement film.

An electrolyte resin particle or a resin particle integratable with the electrolyte membrane when melted is sprayed to sites on the electrolyte membrane where the sealing ribs are to be formed. Examples of the resin particle integratable with the electrolyte membrane when melted include PFA, FEP, ETFE, PVDF, etc., which are fluorine-based resins. The electrolyte resin particle to be sprayed may be an arbitrary electrolyte resin particle on condition that the resin particle is integratable with the electrolyte membrane main body when thermally melted. For example, the electrolyte resin particle may be a particle of the resin that is the same as the electrolyte resin that forms the electrolyte membrane main body. In view of operability, the particle diameter of the resin particle may be 10 μm or greater.

The sprayed resin particle or the sprayed electrolyte resin particle is thermally melted by, for example, sandwiching it between heating dies, sealing ribs of a predetermined height are formed integrally with the electrolyte membrane. In this case, too, the height of the sealing ribs is set in accordance with the thickness of the gas diffusion electrodes that are provided to be combined with the electrolyte membrane to form a membrane-electrode assembly. In the case of a membrane-electrode assembly used in ordinary solid polymer fuel cells, the height of the sealing ribs is within the range of 10 μm to 500 μm.

Incidentally, this production method may be applied to an electrolyte membrane that is a single membrane. In that case, a membrane-electrode assembly is formed by forming gas diffusion electrodes on the electrolyte membrane provided with sealing ribs formed integrally therewith. Besides, this production method may also be applied to an electrolyte membrane that extends sideway from end portions of the gas diffusion electrodes of the membrane-electrode assembly that is formed beforehand. In any case, the resin particle is subjected to a thermally melting process, and therefore, a fluorine type electrolyte resin particle that does not thermally degrade may be used. In that case, the electrolyte membrane (or membrane-electrode assembly) provided with sealing ribs formed integrally therewith is subjected to a process of giving ion exchange characteristic to an electrolyte polymer by a hydrolysis process or the like.

A seventh aspect of the invention relates to a further production method for an electrolyte membrane. The method includes at least the step where an electrolyte membrane that does not have a sealing rib is created, and the step where a portion of the created electrolyte membrane obtained by excluding a portion where the sealing rib is to be created is pressed at a temperature that is higher than or equal to a softening point of the electrolyte membrane. According to this production method, an electrolyte membrane provided with sealing ribs of a predetermined height formed integrally therewith can be obtained by simpler steps. The regions to be pressed may be only a region where the gas diffusion electrodes are formed when the pressed electrolyte membrane is used to form a membrane-electrode assembly. In that case, recessed portions may be formed on the two surfaces of the electrolyte membrane by pressing the electrolyte membrane so that the recessed portions have a depth substantially equal to the thickness of the gas diffusion electrodes.

According to the invention, an electrolyte membrane and a membrane-electrode assembly that are able to improve the sealing characteristic of a cell when used to form a fuel cell is obtained. Furthermore, a fuel cell with improved sealing characteristic is obtained.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2A shows a state where an electrolyte thin film is extruded from a die so as to have an elongated shape, and FIG. 2B shows a resin ejection opening of the die in a sectional view, and FIG. 2C is a cross-sectional view taken on line c-c of FIG. 2A, showing an extruded electrolyte thin film;

FIG. 3A shows an electrolyte membrane cut to a predetermined width, and FIG. 3B shows a state where a superimposed portion is formed at a side edge portion, and FIG. 3C shows a state of electrolyte membrane after the superimposed portions have been melted by heating, and FIG. 3D shows an electrolyte membrane after the working process;

FIG. 4A shows a state where a reinforced type electrolyte thin film is extruded from a die, in an elongated shape, and FIG. 4B shows a membrane passing path outlet portion of the die in a cross-section, and FIG. 4C shows an extruded electrolyte thin film in a cross-section;

FIGS. 6A to 6C illustrate the production processes, and FIG. 6D shows an electrolyte membrane obtained;

DETAILED DESCRIPTION OF EXAMPLE EMBODIMENTS

Figure 1A:
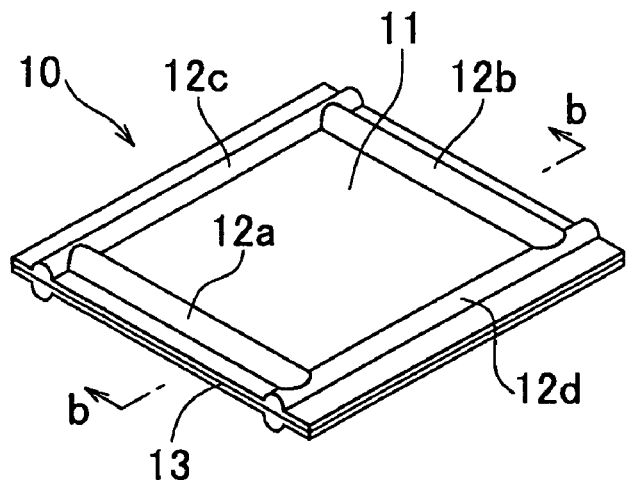
FIG. 1A is a diagram schematically showing an embodiment of an electrolyte membrane in accordance with the invention.
Figure 1B:
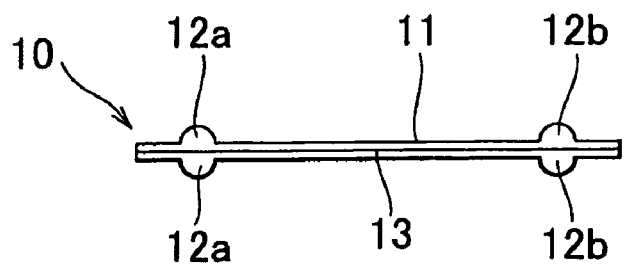
FIG. 1B is a cross-sectional view taken along line b-b of FIG. 1A.
Figure 1C:
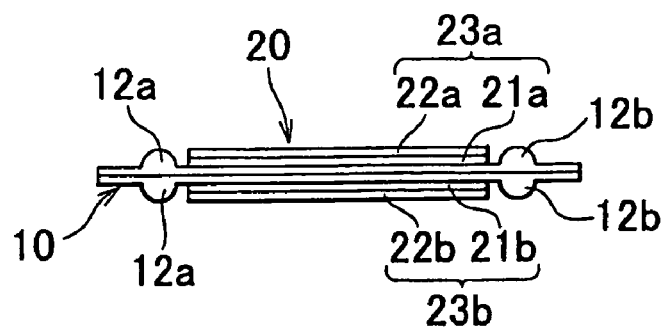
FIG. 1C is a cross-sectional view schematically showing an embodiment of a membrane-electrode assembly in accordance with the invention.
Figure 1D:
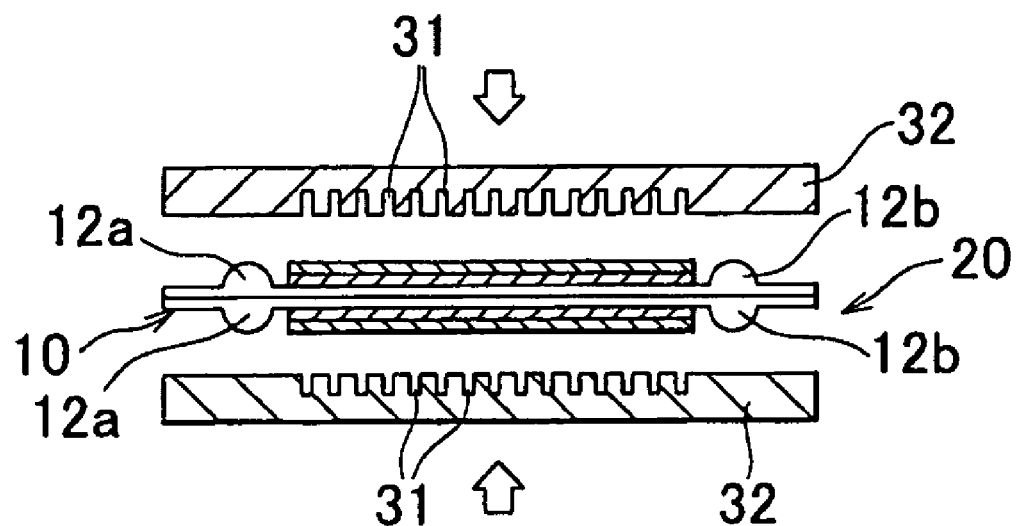
FIG. 1D is a schematic cross-sectional view showing a process of producing an embodiment of a fuel cell in accordance with the invention.
Figure 1E:
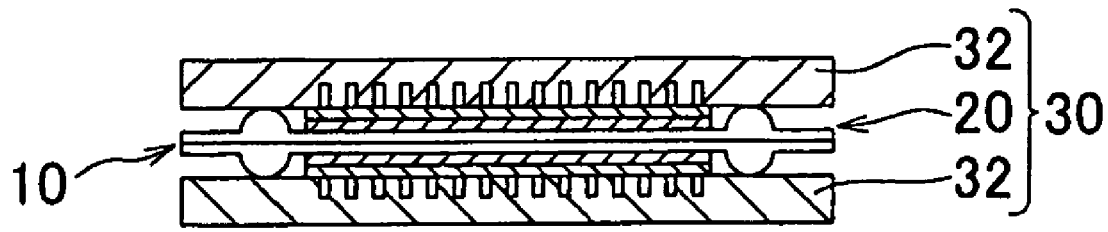
FIG. 1E is a cross-sectional view schematically showing a fuel cell after the production process.

Embodiments of the invention will be described hereinafter with reference to the drawings. FIGS. 1A and 1B are diagrams schematically showing an embodiment of the electrolyte membrane in accordance with the invention, and FIG. 1C is a diagram schematically showing an embodiment of the membrane-electrode assembly in accordance with the invention, and FIGS. 1D and 1E are diagrams schematically showing a cross-section of an embodiment of the fuel cell in accordance with the invention. FIGS. 2A to 2C and FIGS. 3A to 3D are diagrams schematically illustrating a first embodiment of the method of producing an electrolyte membrane in accordance with the invention. FIGS. 4A to 4C are diagrams schematically illustrating a second embodiment of the method of producing an electrolyte membrane in accordance with the invention. FIGS. 5A to 5D are diagrams schematically illustrating a third embodiment of the method of producing an electrolyte membrane in accordance with the invention. FIGS. 6A to 6D and FIGS. 7A to 7C are diagrams schematically illustrating still further embodiments of the method of producing an electrolyte membrane in accordance with the invention.

As shown in a perspective view in FIG. 1A and a cross-sectional view in FIG. 1B taken on line b-b FIG. 1A, a solid polymer electrolyte membrane 10 is rectangular as a whole. In the solid polymer electrolyte membrane 10, sealing ribs 12a to 12d made of an electrolyte resin that is the same as the electrolyte resin that forms an electrolyte membrane main body 11 are formed integrally with the two opposite surfaces of the electrolyte membrane main body 11, extending along the four side edges of the rectangular electrolyte membrane main body 11. Besides, in this embodiment, the electrolyte membrane 10 has a porous reinforcement film 13, such as a stretched PTFE or the like, and is thus provided as a reinforced type electrolyte membrane. The porous reinforcement film 13 may be omitted. Furthermore, the sealing ribs 12 do not need to be formed along all the four side edges. For example, it is permissible that only two opposite side edges be provided with sealing ribs 12a, 12b or sealing ribs 12c, 12d.

FIG. 1C schematically shows a cross-section of a membrane-electrode assembly 20 that is made up of the electrolyte membrane 10 and gas diffusion electrodes 23a, 23b. An anode-side gas diffusion electrode 23a made up of a catalyst layer 21a and a gas diffusion layer 22a on the anode side is stacked on one of the two surfaces of the electrolyte membrane 10, and a cathode-side gas diffusion electrode 23b made up of a catalyst layer 21b and a gas diffusion layer 22b on the cathode side is stacked on the other surface of the solid polymer electrolyte membrane 10. The electrolyte membrane 10 is larger than the gas diffusion electrodes 23a, 23b, and extends further sideway from the four side end portions of the gas diffusion electrodes 23a, 23b. Then, the sealing ribs 12a to 12d are formed integrally with the extensions of the electrolyte membrane main body 11 to a height that is greater than the thickness of the gas diffusion electrodes 23a, 23b. In an ordinary solid polymer fuel cell, the height of the sealing ribs 12a to 12d is in the range of 10 μm to 500 μm.

Using the membrane-electrode assembly 20 shown in FIG. 1C, a fuel cell 30 is formed. As shown in FIG. 1D, separators 32 each having a gas channel 31 are disposed on the two opposite surfaces of the membrane-electrode assembly 20. In accordance with needs, a small amount of adhesive is applied to the sealing ribs 12a to 12d. Through the pressure welding of the membrane-electrode assembly 20 and the separators 32 under overall pressurization, a fuel cell 30 as shown in FIG. 1E is provided. As described above, the fuel cell 30, whose sealing ribs 12a to 12d are formed from the same electrolyte resin as the electrolyte membrane main body 11 integrally with the electrolyte membrane main body 11, secures a high sealing characteristic. In addition, the resin that forms the sealing ribs may be any resin if it is a resin that can be integrated with the electrolyte membrane main body 11 when thermally melted, and does not need to be the same as the electrolyte resin that forms the electrolyte membrane main body 11. Examples of the resin include PFA, FEP, ETFE, PVDF, etc. which are fluorine-based resins.

Figure 2A:
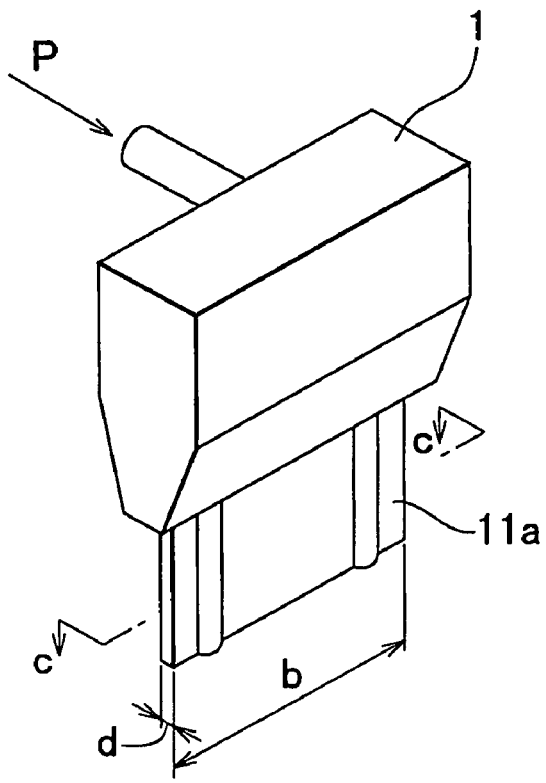
FIGS. 2A to 2C are diagrams schematically showing a first embodiment of a method of producing an electrolyte membrane in accordance with the invention.
Figure 2B:
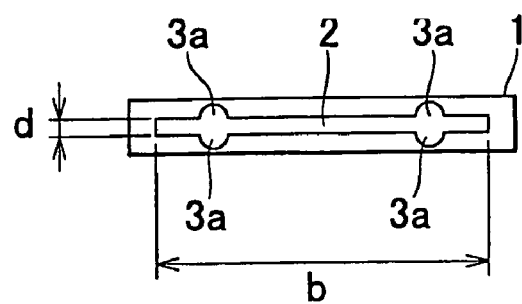
Figure 2C:
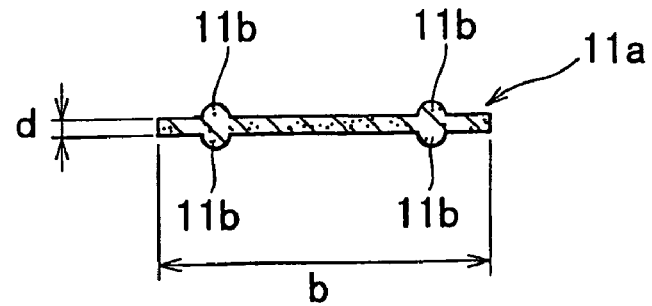

Next, an embodiment of the method of producing an electrolyte membrane in accordance with the invention will be described with reference to FIGS. 2A to 2C and 3A to 3D. In this production method, fluorine type electrolyte resin is used as an electrolyte resin. A fluorine type electrolyte resin particle is placed in a conventionally known resin kneading extruder device (not shown), and is heated and kneaded. The electrolyte resin p melted thereby is pressure-fed to a die 1 as shown in FIG. 2A. The die 1 has a resin ejection opening 2 whose cross-sectional shape is shown in FIG. 2B. The electrolyte resin p is extruded from the resin ejection opening 2.

As shown in FIG. 2B, the resin ejection opening 2 has a flattened shape as a whole in which the lateral width b is greater than the vertical width d. Recessed grooves 3a, 3a are formed near two opposite side edges of the resin ejection opening 2 in the lateral width direction. Therefore, the molten electrolyte resin p fed into the die 1, as shown in FIG. 2A, is extruded from the resin ejection opening 2 as an elongated-shape electrolyte thin film 11a having a thickness d and a lateral width b. As shown in the cross-sectional view in FIG. 2C taken on line c-c of FIG. 2A, each of the two surfaces of the extruded electrolyte thin film 11a has ridges 11b, 11b that are formed integrally with the surface, extending along the two side edges of the electrolyte thin film 11a, in accordance with the shape of the recessed grooves 3a, 3a formed in the resin ejection opening 2. Incidentally, although the recessed grooves 3a, 3a are shown in the drawings as having a semi-circular cross-sectional shape, the cross-section thereof may have an arbitrary shape, such as a triangular shape, an elliptic shape, a rectangular shape, etc.

Figure 3A:
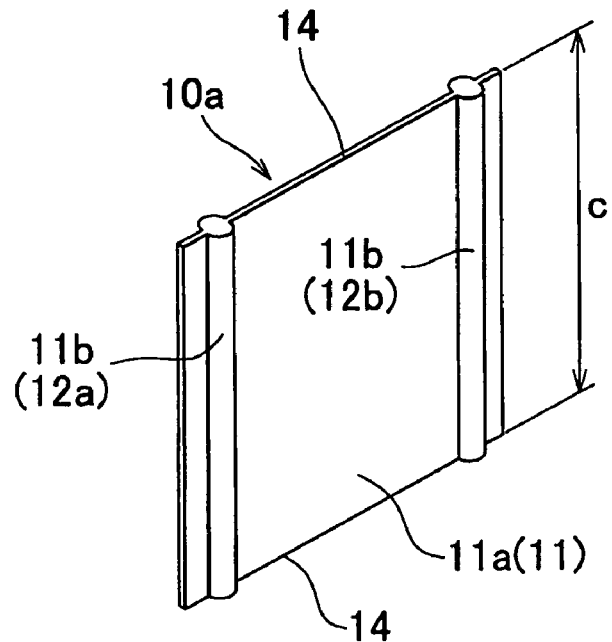
FIGS. 3A to 3D show processes performed on the electrolyte membrane obtained by the method shown in FIGS. 2A to 2C.
Figure 3B:
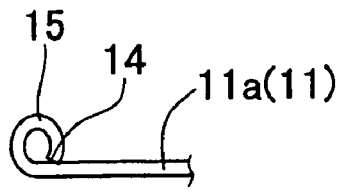
Figure 4A:
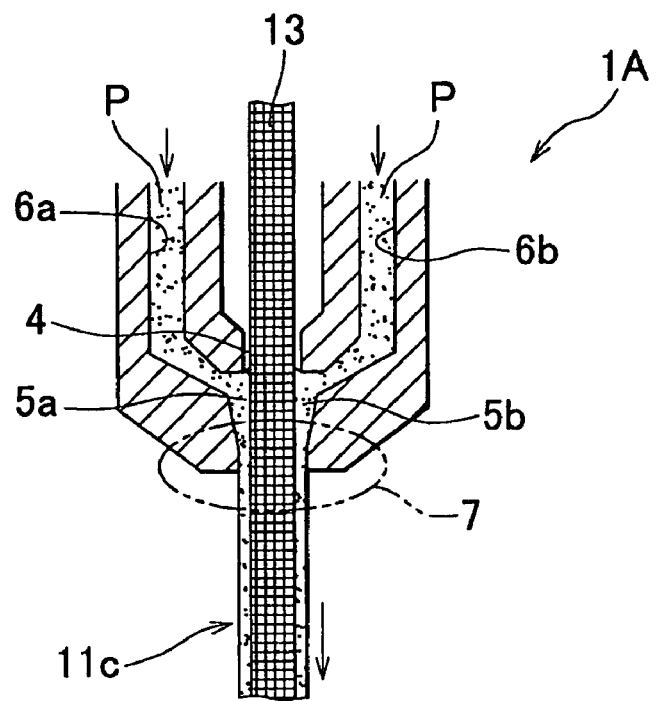
FIGS. 4A to 4C are diagrams schematically illustrating a second embodiment of a method of producing an electrolyte membrane in accordance with the invention.
Figure 4B:
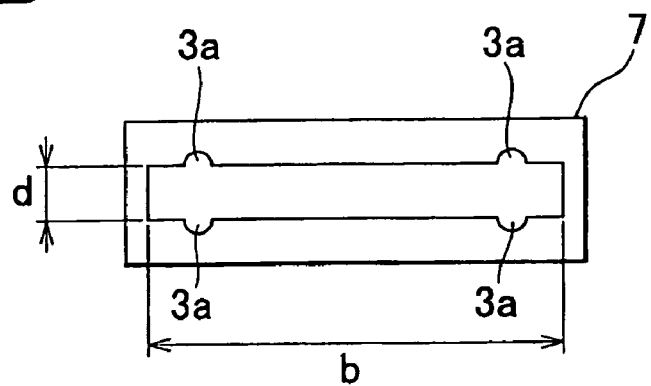
Figure 4C:
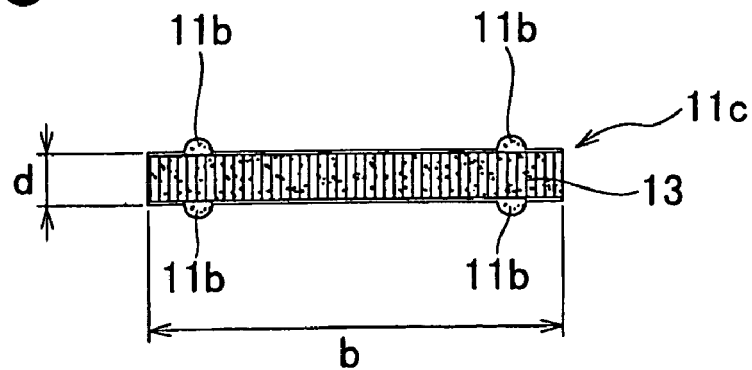

The elongated-shape electrolyte thin film 11a, after being cooled, is cut to a predetermined longitudinal length c into a rectangular electrolyte membrane 10a as shown in FIG. 3A. In the comparison between the electrolyte membrane 10a and the electrolyte membrane 10 shown in FIGS. 1A and 1B, the electrolyte thin film 11a corresponds to the electrolyte membrane main body 11, and the two ridges 11b, 11b correspond to the sealing ribs 12a, 12b. Although the two cut sides 14 of the electrolyte membrane 10a are not provided with a sealing rib, this shape of the electrolyte membrane 10a suffices for the use in fuel cells depending on the configurations of the fuel cells.

Figure 3C:
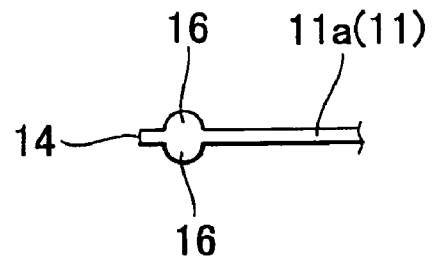
Figure 3D:
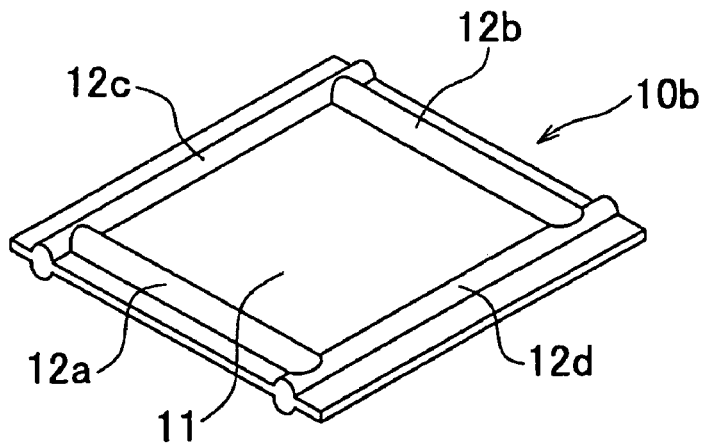

To obtain an electrolyte membrane having sealing ribs along the four side edges as in the electrolyte membrane 10 shown in FIGS. 1A and 1B, the two cut sides 14, 14 of the electrolyte thin film 11a are, for example, rolled or bent back, to form superimposed portions 15. Next, using a heating die or the like, at least the formed superimposed portions 15 are melted by heating. As a result, as shown in FIG. 3C, sealing ribs 16, 16 along the two cut-side sides 14, 14 of the electrolyte membrane main body 11 are formed in a state where the sealing ribs 16, 16 are integrated with the electrolyte membrane main body 11. Thus, as shown in FIG. 3D, an electrolyte membrane 10b having sealing ribs along the four sides is obtained. In addition, the electrolyte membrane 10b corresponds to the electrolyte membrane 10 shown in FIGS. 1A and 1B from which the porous reinforcement film 13 is removed, and the corresponding portions in FIG. 3D are denoted by the same reference characters as in FIG. 1A.

Next, an example of the production method for producing an electrolyte membrane 10 that has a porous reinforcement film 13 shown in FIGS. 1A and 1B will be described with reference to FIGS. 4A to 4C. In this method, a die 1A having a shape as shown in FIG. 4A is used. The die 1A has a membrane passing path 4 through which the porous reinforcement film 13 passes, and resin ejection openings 5a, 5b that are located at the two opposite surfaces of the porous reinforcement film 13 that passes through the membrane passing path 4. Each of the resin ejection openings 5a, 5b communicates with a corresponding one of resin supply passageways 6a, 6b. The resin supply passageways 6a, 6b are supplied with the thermally melted electrolyte resin p, for example, which is a fluorine type electrolyte, under a predetermined pressure from a kneading extruder device for the electrolyte resin. The shape of an outlet portion 7 of the membrane passing path 4 is substantially the same as the shape of the resin ejection opening 2 of the die 1 shown in FIG. 2, and specifically, has a flattened shape as a whole in which the vertical width d is greater than the lateral width b as shown in FIG. 4B, and the recessed grooves 3a, 3a are formed near the two side ends in the lateral width direction.

The molten electrolyte resin p supplied to the resin supply passageways 6a, 6b is extruded from the resin ejection openings 5a, 5b at a predetermined pressure, and impregnates the porous reinforcement film 13 from the two surface sides. Due to the extruding force created by the elasticity of the resin p, the porous reinforcement film 13 impregnated with the resin p is extruded from the outlet portion 7 of the membrane passing path 4, into an elongated shape as an electrolyte membrane main body 11c. The extruded reinforced type electrolyte thin film 11c has a thickness d and a lateral width b, and has a porous reinforcement film 13 inside therein, as shown in the cross-sectional view in FIG. 4C. Besides, each of the two surfaces of the reinforced type electrolyte thin film 11c has, along the two sides thereof, ridges 11b, 11b that are integrally formed therewith. The ridges 11b, 11b have a shape that corresponds to the shape of the recessed grooves 3a, 3a formed in the outlet portion 7. Incidentally, in this case, too, the cross-sectional shape of the recessed grooves 3a, 3a may have an arbitrary shape, such as a triangular shape, an elliptic shape, a rectangular shape, etc. Although not described again, the thus-obtained elongated-shape electrolyte membrane main body 11c is subjected to substantially the same process as the process described above with reference to FIGS. 3A to 3D, so that a solid polymer electrolyte membrane 10 as shown in FIG. 1A is obtained.

Next, a third embodiment of the method of producing an electrolyte membrane in accordance with the invention will be described with reference to FIGS. 5A to 5D. In this embodiment, an electrolyte thin film 10s shown in FIG. 5A which does not have a sealing rib as described above is used as a starting material. The electrolyte thin film 10s may be produced by an arbitrary method, and may also have a porous reinforcement film although not shown. At sites on the electrolyte thin film 10s where the sealing ribs 12 should be formed, a thermally meltable resin particle pa whose particle size is preferably 10 μm or greater may be sprayed up to a predetermined thickness as shown in the perspective view and the cross-sectional view in FIG. 5B. In the construction shown in FIGS. 5A to 5D, a plurality of gas passing openings 17 are formed in the electrolyte thin film 10s, and the thermally meltable resin particle pa is sprayed around the gas passing openings 17. However, the thermally meltable resin particle pa may instead be sprayed in a linear shape along the four sides as in the foregoing electrolyte membranes 10, 10a. The thermally meltable resin particle pa to be sprayed may be an arbitrary thermally meltable resin particle on condition that the resin particle is integrated with the electrolyte thin film 10s when thermally melted. Examples of the resin particle pa include PFA, FEP, ETFE, PVDF, etc., which are fluorine-based resins. The thermally meltable resin particle may be a particle of the resin that is the same as the electrolyte resin that forms the electrolyte thin film 10s.

Figure 5A:
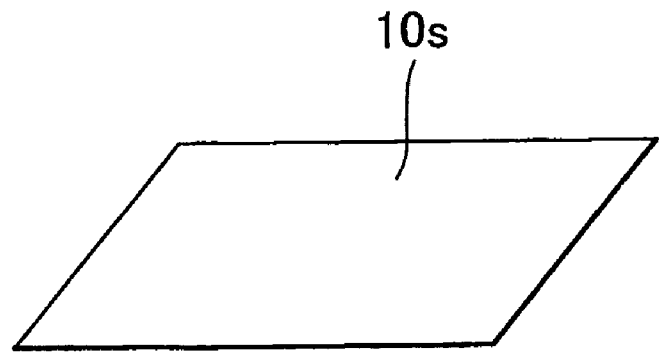
FIGS. 5A to 5D are diagrams schematically illustrating a third embodiment of a method of producing an electrolyte membrane in accordance with the invention, each showing a production process.
Figure 5B:
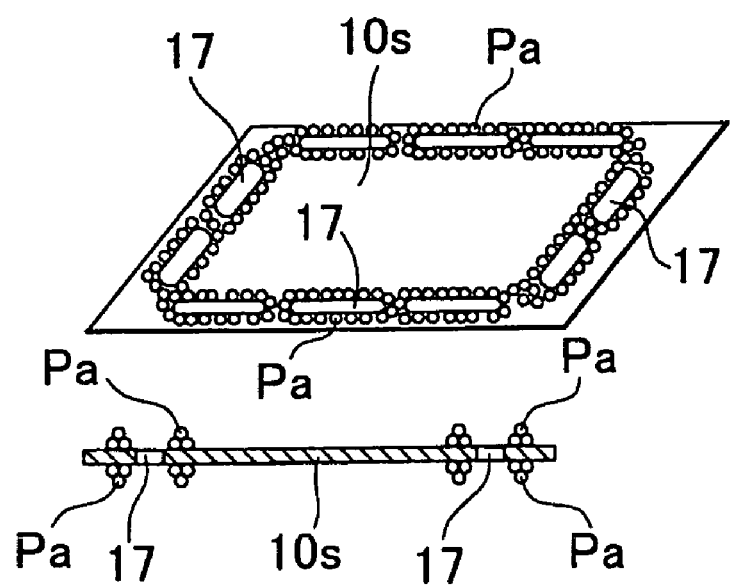
Figure 5C:
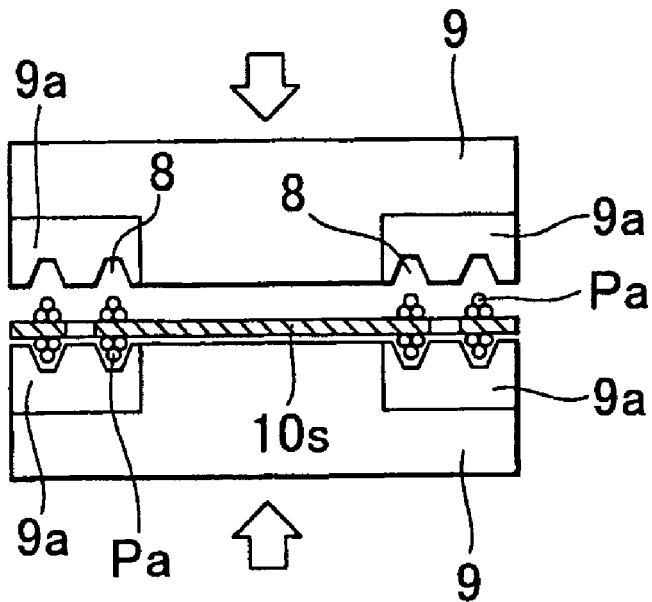
Figure 5D:
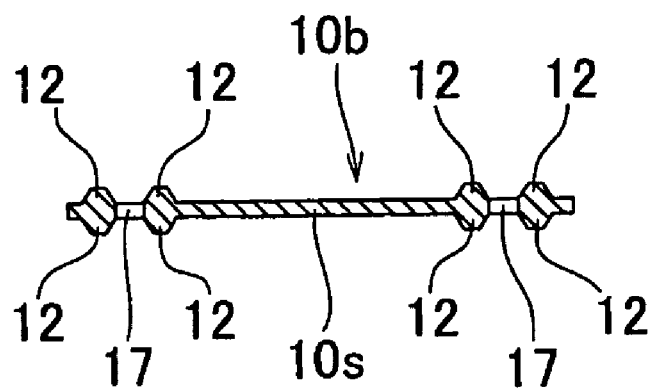

Next, as shown in FIG. 5C, the sprayed thermally meltable resin particle pa is sandwiched by heating dies 9, 9 that have heating portions 9a, 9a with recessed grooves 8, and is melted by heating. Therefore, sealing ribs 12 of a predetermined height are formed from the molten resin particle pa integrally with the electrolyte thin film 10s. Thus, a sealing rib-equipped electrolyte membrane 10b in accordance with the invention as shown in FIG. 5D is obtained. In this case, too, the height of the sealing ribs 12 is set, obviously, in accordance with the thickness of the gas diffusion electrodes that are provided when a membrane-electrode assembly is to be formed by using the electrolyte membrane 10b.

Although not shown, gas diffusion electrodes 23a, 23b are stacked on the electrolyte membrane 10b shown in FIG. 5D to form a membrane-electrode assembly 30. Besides, it is also permissible to form a membrane-electrode assembly 20 in which gas diffusion electrodes 23a, 23b are stacked on an electrolyte thin film 10s (see FIG. 1) beforehand, to spray an electrolyte resin particle pa to necessary sites in the regions of the electrolyte membrane 10a which extend sideways from the end portions of the gas diffusion electrodes, and to perform thermally melting process.

Figure 6A:
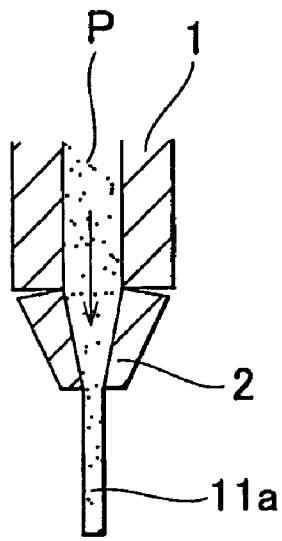
FIGS. 6A to 6D are diagrams schematically illustrating a further embodiment of a method of producing an electrolyte membrane in accordance with the invention.
Figure 6B:
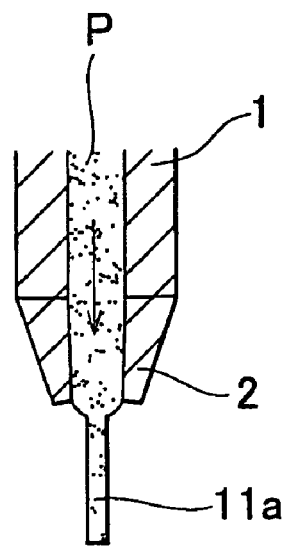
Figure 6C:
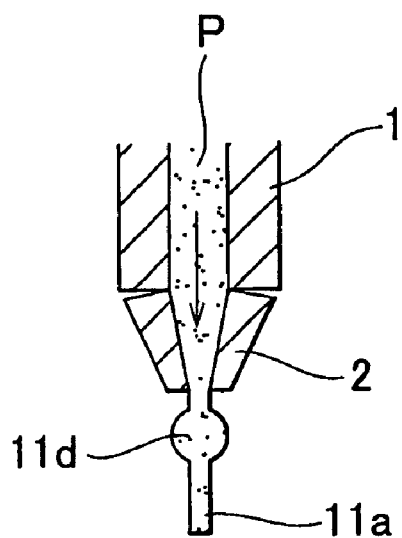

FIGS. 6A to 6D show a further embodiment of the production method for an electrolyte membrane in accordance with the invention. This embodiment is an improved form from the first embodiment of the method of producing an electrolyte membrane which has been described with reference to FIG. 2. Specifically, during a process of extruding an electrolyte thin film 11a into an elongated shape through the use of a die 1 as shown in FIG. 6A, a process is repeated in which a resin ejection opening 2 of the die 1 is expanded to a predetermined width as shown in FIG. 6B at a predetermined timing and, after a predetermined amount of time, the die 1 is returned to the previous opening width. As a result, as shown in FIG. 6C, a region 11d with an increased thickness which corresponds to the duration of the width expansion of the resin ejection opening 2 is formed in the direction of the lateral width direction of the extruded electrolyte thin film 11a.

Figure 6D:
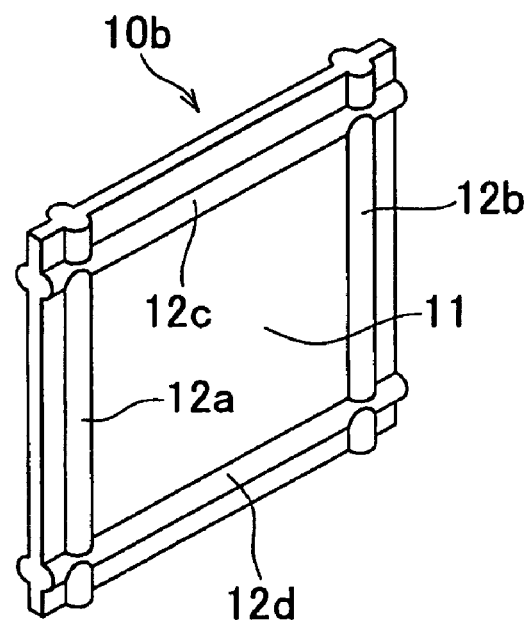

According to this method, the two protruded ridges 11b, 11b based on the recessed grooves 3a, 3a formed in the die 1 are formed integrally with each of the two surfaces of the elongated-shape electrolyte thin film 11a, extending in the lengthwise direction of the electrolyte thin film 11a. Simultaneously, the thickened regions 11d extending in the direction of the width of the electrolyte thin film 11a and having a height and a width that correspond to the expanded opening width and the expansion time of the die 1 can be formed at predetermined intervals. Therefore, merely by cutting the obtained elongated-shape electrolyte thin film 11a at a predetermined site, an electrolyte membrane 10b having a shape as shown in FIG. 6D can be obtained. In addition, the members in FIG. 6D corresponding to those in FIG. 1A are denoted by the same reference characters as in FIG. 1A.

Figure 7A:
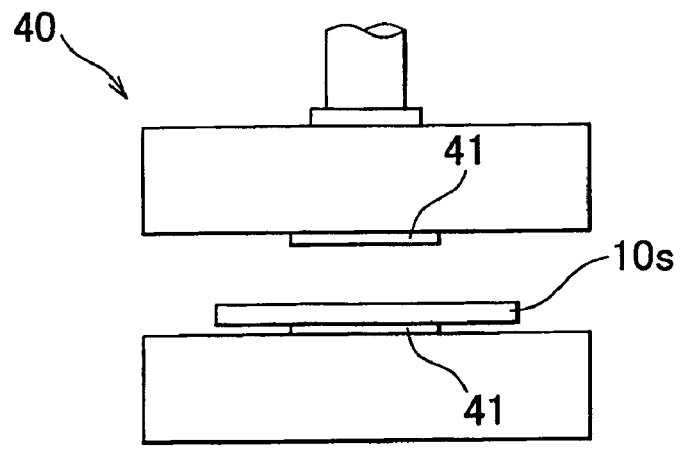
FIGS. 7A to 7C are diagrams schematically illustrating two more embodiments of a method producing an electrolyte membrane in accordance with the invention, and FIG. 7A schematically illustrate an embodiment that employs a heating press machine, and FIG. 7C schematically shows an embodiment that uses a roll press.
Figure 7B:
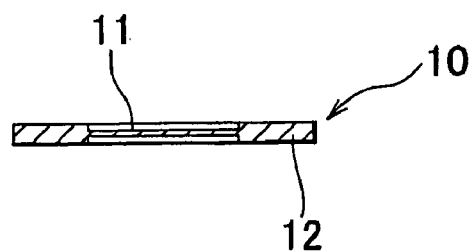
Figure 7C:
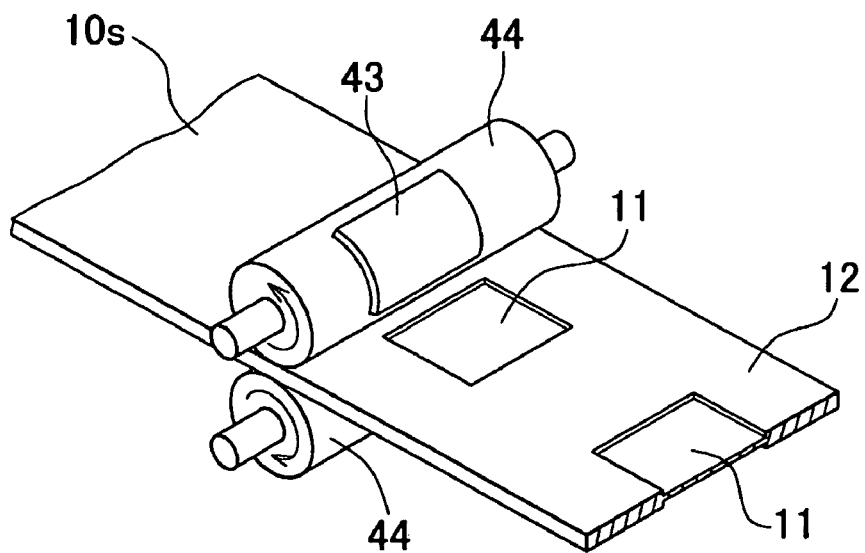
Figure 8:
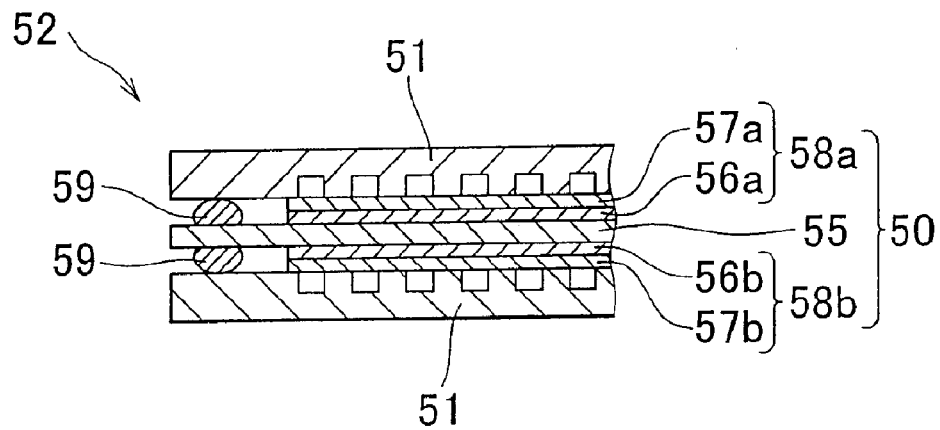
FIG. 8 is a schematic cross-sectional view showing an example of related-art fuel cells.
Figure 9:
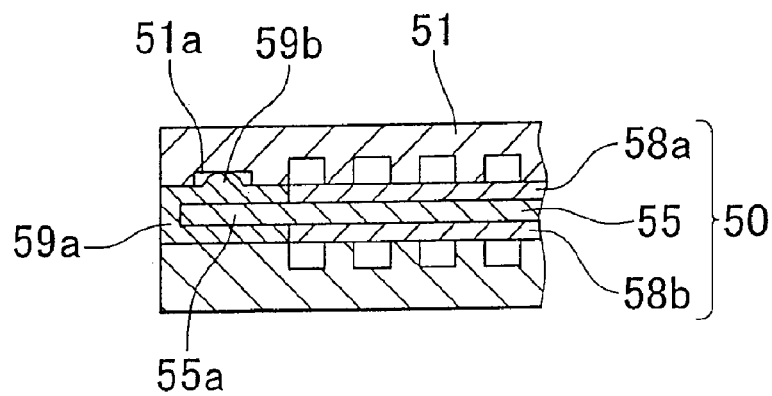
FIG. 9 is a schematic cross-sectional view showing another example of the related-art fuel cell.

FIGS. 7A to 7C further show two more embodiments of the production method for an electrolyte membrane in accordance with the invention. In these embodiments, an electrolyte membrane having a substantially uniform membrane thickness over the entire membrane is created as a pre-forming by a conventionally known method, and a portion of the electrolyte membrane excluding portions where at least sealing ribs should be formed is hot-pressed at a temperature higher than or equal to the softening point of the electrolyte membrane, so that the membrane thickness is reduced by about an amount that corresponds to the thickness of the gas diffusion electrodes. On the regions in which the membrane thickness of the electrolyte membrane has been reduced, gas diffusion electrodes are formed. The portions of the electrolyte membrane having a relatively great thickness and surrounding the thickness-reduced regions perform the function as a sealing rib.

Specifically, for example, an electrolyte thin film (pre-forming) 10s having a substantially uniform membrane thickness of about 10 μm to about 100 μm and not provided with a sealing rib is formed from, for example, a side chain terminal group-$SO_2F$ type electrolyte precursor resin. Then, as shown in FIG. 7A, using a heating press machine 40 having upper and lower heat plates 41, 41, the electrolyte thin film 10s, excluding the peripheral portions, is hot-pressed at a temperature higher than or equal to the softening point of the electrolyte resin. Therefore, as shown in FIG. 7B, an electrolyte membrane 10 is obtained in which the hot-pressed portions form a thin-walled electrolyte membrane main body portion 11, and the peripheral portions form sealing ribs 12 with a maintained thickness.

The electrolyte membrane main body portion 11 is subjected to a hydrolysis process, whereby side chain terminal groups are substituted from —$SO_2F$ to —$SO_2H$. In the region of the electrolyte membrane main body 11, gas diffusion electrodes (not shown) are formed, so as to form a membrane-electrode assembly. Since the regions of peripheral sealing ribs 12 are relatively thick and remain as being made of the precursor resin, an electrolyte membrane with a great strength, which sufficiently withstands the stress that is likely to concentrate around the electrodes, is obtained.

FIG. 7C shows another embodiment of the forming method. In this method, a belt-like electrolyte thin film 10s whose thickness is substantially uniform is prepared as a pre-forming beforehand, and the pre-forming is passed between a pair of upper and lower heated rolls 44, 44 that are provided with a protruded portion 43 having the shape of an electrode. As the upper and lower heated rolls 44, 44 rotate, regions with a reduced thickness (thin-walled electrolyte membrane main body portions 11) are continually formed by rolling on each of the obverse and reverse sides of the belt-like electrolyte thin film (pre-forming) 10s, and the peripheral portions are left as sealing ribs 12 whose thickness is maintained. By cutting the electrolyte thin film 10s into a predetermined size, an electrolyte membrane as shown in FIG. 7B is obtained.

Incidentally, in the embodiments of the production method shown in FIGS. 7A to 7C, a porous reinforcement film-equipped electrolyte membrane may also be used as an electrolyte thin film (pre-forming) 10s.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A method of producing a solid polymer fuel cell-purpose elongated-shape electrolyte membrane that has sealing ribs of a predetermined height made of an electrolyte resin which are formed integrally with the electrolyte membrane, comprising:

forming the sealing ribs of the predetermined height made of the electrolyte resin integrally with the elongated-shape electrolyte membrane near two side edges of the elongated-shape electrolyte membrane by using a die having, near two side edges of a resin ejection opening, recessed grooves whose depth corresponds to the height of the sealing ribs, and extruding the electrolyte resin from the resin ejection opening of the die, and extruding the electrolyte resin from the resin ejection opening of the die to form an electrolyte membrane main body.

2. The method according to claim 1, wherein the electrolyte membrane includes a porous reinforcement film as an integrated portion, wherein the die has a membrane passing path through which the porous reinforcement film passes, wherein the recessed grooves are formed near two side edges of an outlet portion of the membrane passing path, wherein additional resin ejection openings are positioned at two surfaces of the porous reinforcement film that passes through the membrane passing path, wherein while the porous reinforcement film is being passed through the membrane passing path, the electrolyte resin is extruded from the additional resin ejection openings so that the porous reinforcement film is impregnated with the electrolyte resin, and wherein when the porous reinforcement film impregnated with the resin passes through the outlet portion of the membrane passing path, the sealing ribs of the predetermined height made of the electrolyte resin are formed together with the resin-impregnated porous reinforcement film, near two side edges of the porous reinforcement film, so that the porous reinforcement film is extruded from the die as an elongated-shape reinforced type electrolyte membrane.

3. The production method for the electrolyte membrane according to claim 1, further comprising:

cutting the produced elongated-shape electrolyte membrane provided with the sealing ribs of the predetermined height made of the electrolyte resin which are formed integrally with the electrolyte membrane near the two side edges of the electrolyte membrane, into a rectangular electrolyte membrane with a predetermined width;

forming superimposed portions along two side edges of the rectangular electrolyte membrane along which a sealing rib is not formed integrally with the electrolyte membrane; and forming the electrolyte resin-made sealing ribs of the predetermined height integrally with the electrolyte membrane by melting at least the superimposed portions by sandwiching the superimposed portions between heating dies.

4. The production method for the electrolyte membrane according to claim 2, further comprising:

cutting the produced elongated-shape electrolyte membrane provided with the sealing ribs of the predetermined height made of the electrolyte resin which are formed integrally with the electrolyte membrane near the two side edges of the electrolyte membrane, into a rectangular electrolyte membrane with a predetermined width;

forming superimposed portions along two side edges of the rectangular electrolyte membrane along which a sealing rib is not formed integrally with the electrolyte membrane; and forming the electrolyte resin-made sealing ribs of the predetermined height integrally with the electrolyte membrane by melting at least the superimposed portions by sandwiching the superimposed portions between heating dies.

5. The method according to claim 1, wherein a cross-sectional shape of the resin ejection opening in a plane perpendicular to a direction in which the resin is extruded from the resin ejection opening corresponds to a cross-sectional shape of the electrolyte membrane in a plane perpendicular to a surface of the electrolyte membrane.

\* \* \* \* \*